Dec. 29, 1925.

J. HUEBSCH 1,567,371

AUTOMATIC VALVE FOR WASHING MACHINES

Filed Jan. 12, 1925     4 Sheets-Sheet 1

Dec. 29, 1925.  1,567,371
J. HUEBSCH
AUTOMATIC VALVE FOR WASHING MACHINES
Filed Jan. 12, 1925  4 Sheets-Sheet 2

Inventor
Joseph Huebsch.
By Charles W. Hills
Attys

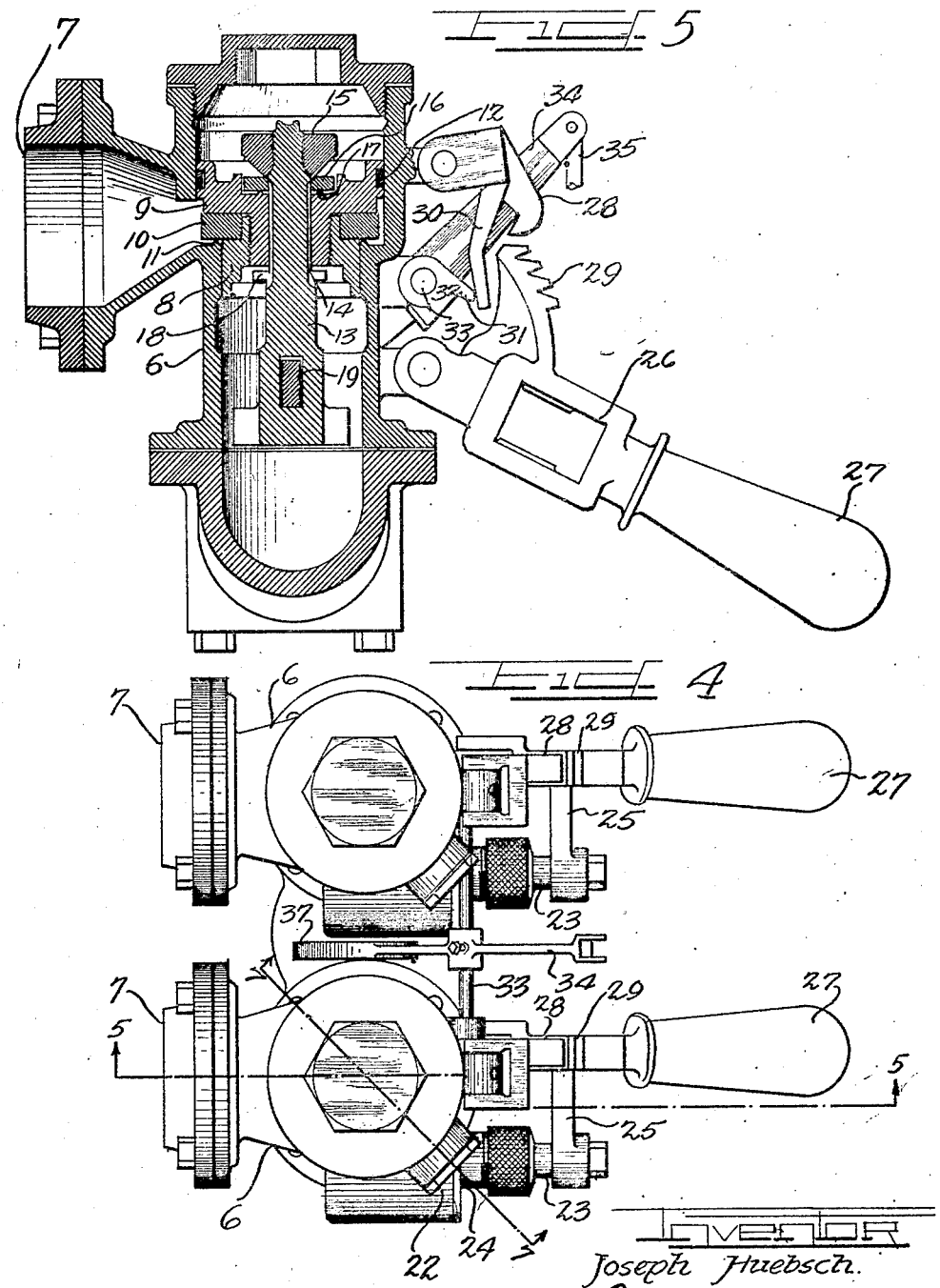

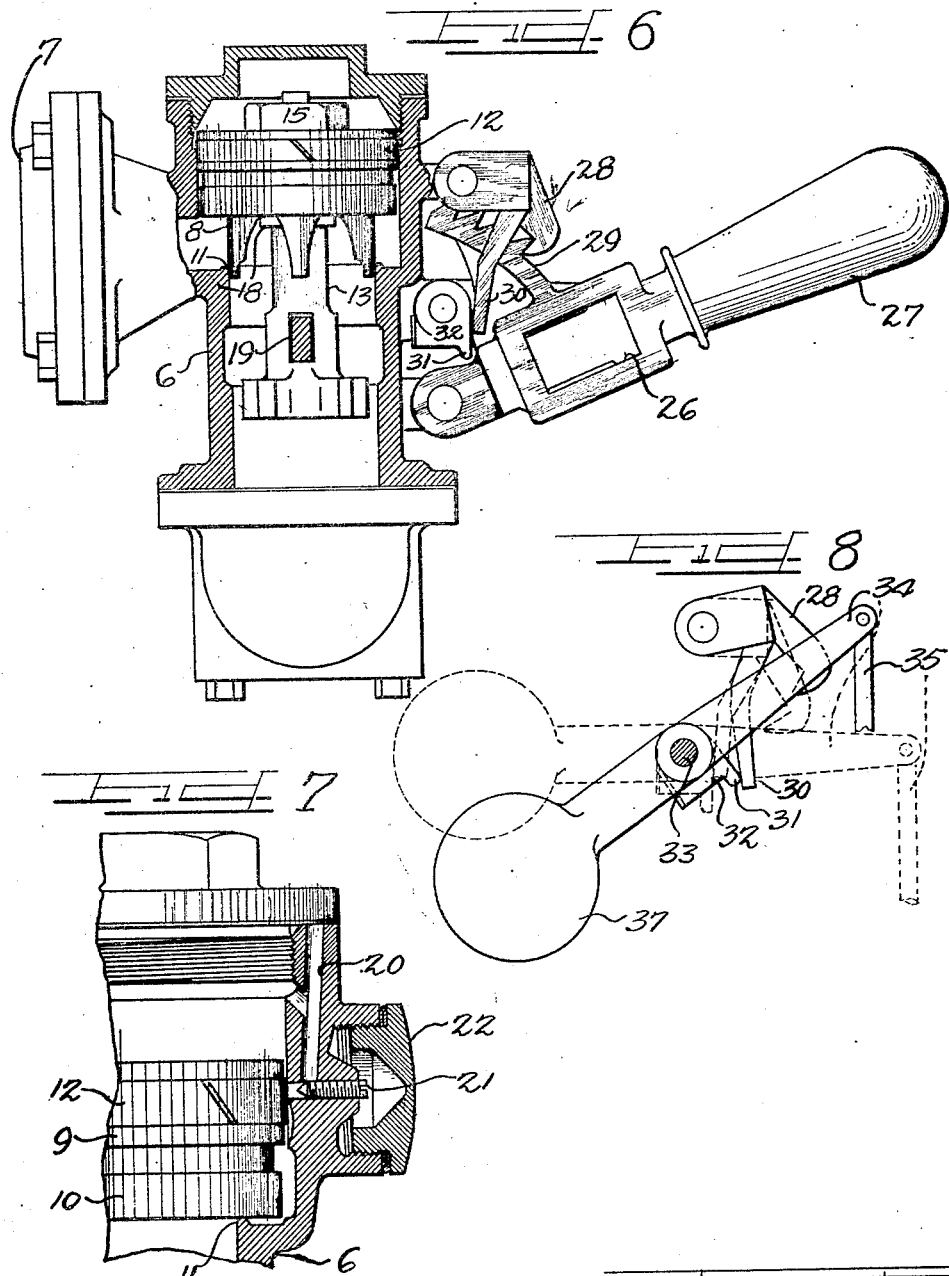

Patented Dec. 29, 1925.

1,567,371

UNITED STATES PATENT OFFICE.

JOSEPH HUEBSCH, OF MILWAUKEE, WISCONSIN.

AUTOMATIC VALVE FOR WASHING MACHINES.

Application filed January 12, 1925. Serial No. 1,783.

*To all whom it may concern:*

Be it known that I, JOSEPH HUEBSCH (full name), a citizen of the United States, and a resident of the city of Milwaukee, in the county of Milwaukee and State of Wisconsin, have invented certain new and useful Improvements in an Automatic Valve for Washing Machines; and I hereby declare that the following is a full, clear, and exact description of the same, reference being had to the accompanying drawings, and to the numerals of reference marked thereon, which form a part of this specification.

This invention relates to automatic float controlled mixing valves, wherein the various valves may be each independently adjusted to an open position to permit an inflowing mixture of fluids, for instance at a certain temperature, and whereby a flow of fluid is maintained from the float chamber to the washing machine, thus insuring clean water at all times in the float chamber and preventing fouling of the same.

Valves of the above class as shown by my prior Patents No. 1,223,584 of April 24, 1917, and No. 978,752 of December 13, 1910, have previously been made with piston valves which necessitated a fine grade of machine work in order to make the piston valve fit the valve chamber accurately enough to give efficient results. In addition, these valves in the past have been designed for use with springs, the latter being necessary to effect the closing of the valves by supplementing the comparatively small force exerted by the float for initiating said closing.

It is therefore the object of this invention to provide a valve of this class in which the use of springs is eliminated.

It is also the object of this invention to provide a valve of this class which by the use of a split ring for the piston valve a closer fit is obtained without necessitating such accurate machine work resulting in a cheaper, more efficient and less expensive device.

It is further an important object of this invention to provide a valve of this class in which the individual valves are vertical and upon the release of the opening lever are returned to closed position by the force of gravity.

It is also the object of this invention to provide in a device of this class a float operated mechanism for releasing the valve opening levers in which is provided a means in combination with the balance feature shown in my prior Patent No. 978,752 for counteracting the weight of the tripping mechanism thereby lessening the force necessary to be exerted by the float to effect the closing of the valves.

Other and further important objects of this invention will be apparent from the disclosures in the specification and the accompanying drawings.

This invention (in a preferred form) is illustrated in the drawings and hereinafter more fully described.

On the drawings:

Figure 4 is a plan view of the device as shown in Figure 2.

Figure 5 is a section along the line 5—5 of Figure 4.

Figure 6 is a vertical view partly in section of the valve mechanism.

Figure 7 is a view partly in section along the line 7—7 of Figure 4.

Figure 8 is a detail view of the tripping mechanism for releasing the opening levers.

As shown on the drawings:

Figure 1:
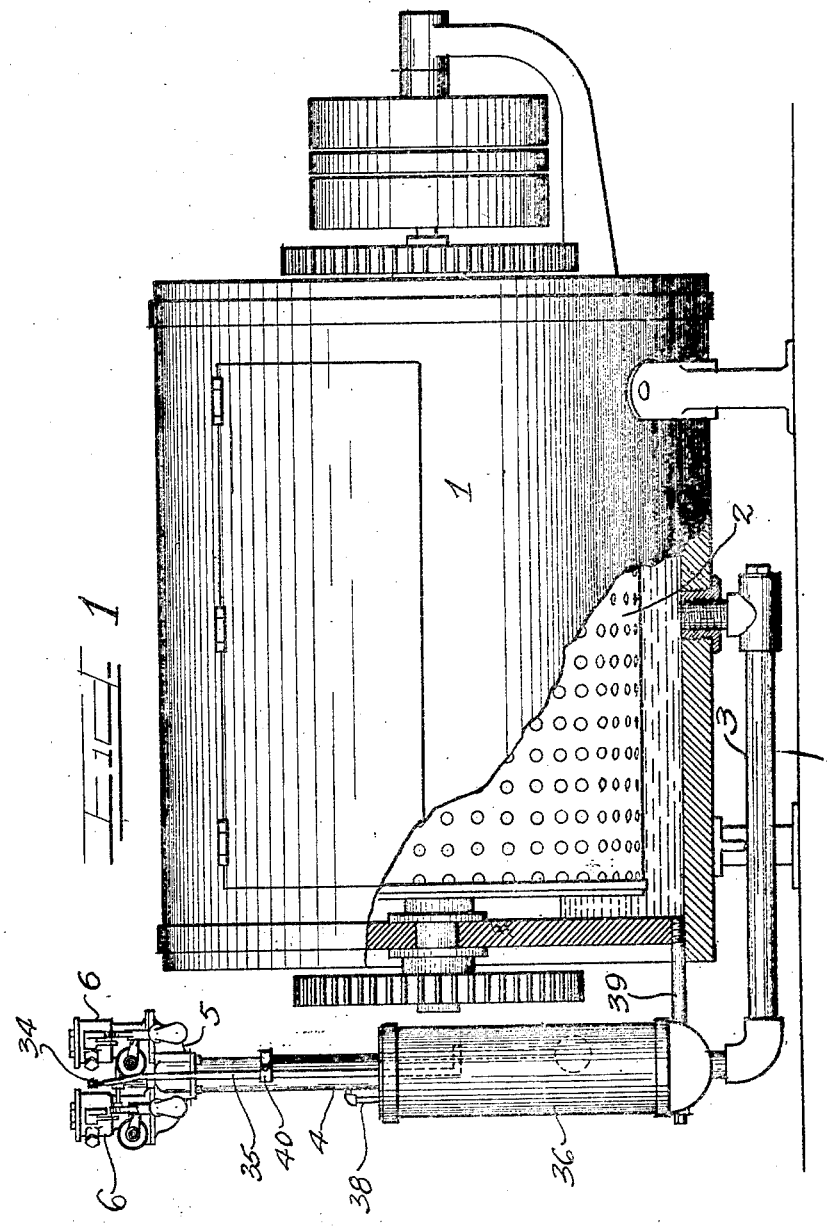
Figure 1 shows the valves connected with a laundry washing machine.
Figure 2:
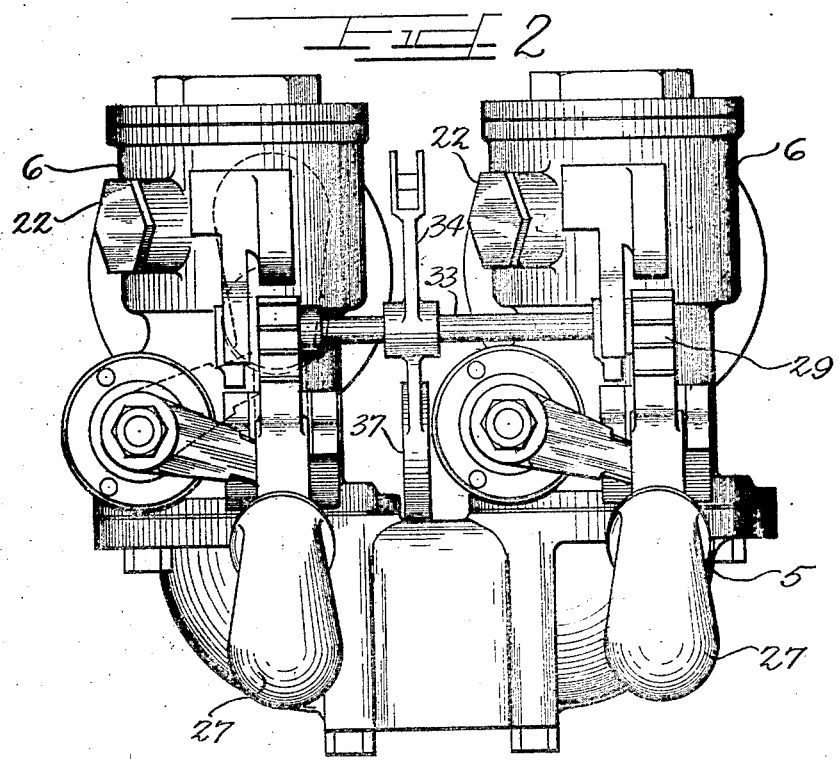
Figure 2 is an enlarged view of the device.

In Figure 1 numeral 1 represents the casing of a washing machine containing a perforated drum 2 for receiving the clothes to be washed. The bottom of the casing 1 is connected by means of a horizontal pipe section 3 and a vertical section 4 to a valve mechanism for controlling the flow of fluid to the machine.

The valve mechanism comprises an outlet chamber 5 which is connected to the pipe 4 and discharges thereto as shown in Figure 1. The chamber 5 has secured thereto at its upper side a plurality of valve casings 6 which communicate with said chamber. Communicating with each of the casings 6 is a supply line 7 through which fluid is delivered at a pressure to the valve mechanism for use in the washing machine.

By referring to Figure 5 it is seen that within each of the casings 6 is a main valve adapted to connect the supply line 7 to the chamber 5 when in open position. The main valve comprises a guide member 8 threaded upon a piston member 9 engaging therebetween a disc 10 of relatively soft composition material which seats upon a seat 11 integral with the casing 6. The casing 6 is bored in its middle portion and its upper portion to fit the guide member 8 and the piston member 9 respectively. The latter member 9 is provided with a split ring 12 so that a fine degree of accuracy in machining the casing and the piston member is not necessary. A stem 13 extends vertically through an aperture 14 in the piston member 9 and has threaded thereon at its upper end a closure member 15. Loosely engaged around the stem 13 above the piston member 9 is a disc 16 of relatively soft composition material which engages between the closure 15 and a seat 17 integral with the piston member 9 when said closure member 15 is in closed position as illustrated in said Figure 5. Integral with the stem 13 a short distance below the piston member 9 is a collar 18 integral with said stem adapted to abut said piston member on the upward movement of the stem. In the lower end of the stem 13 is a slot for receiving the end of an arm 19 which is adapted to be actuated to raise the stem 13 and open the valve as will be described hereinafter.

As shown in Figure 7 the upper portion of the casing 6 is provided with a vertically extending passage 20 which communicates near its upper end with the top of the piston member 9 even when the latter is at its uppermost open position and at its lower end with the inside of the casing adjacent the piston member 9, when the latter is in closed position. The lower communication of passage 20 is adapted to be opened to communicate with the lower portion of the casing when the piston member 9 is moved upwardly away from closed position. A screw 21 is adapted to vary the rapidity of flow in the passage 20. A cap 22 in the casing 6 provides a means of protection and accessibility to the screw 21.

Figure 3:
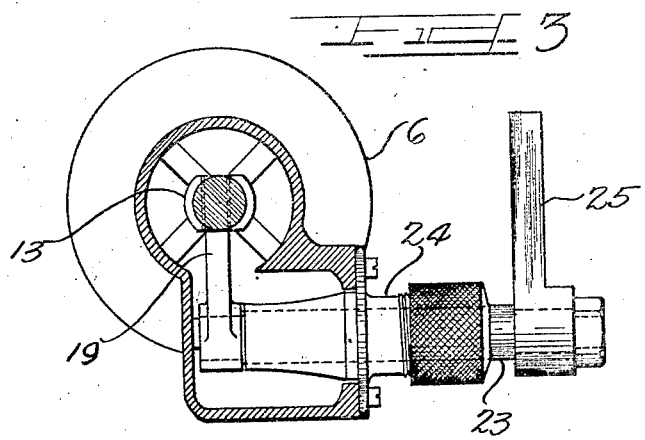
Figure 3 is a horizontal view in section showing the connection between an opening lever and the corresponding valve stem.

By referring to Figures 3 and 4 it will be seen that the arm 19 engaging in the slot in the stem 13 is integral with a shaft 23 which extends through a gland 24 in the side of the casing 6 to the outside of said casing. An arm 25 is rigidly secured to the shaft 23 outside of the casing 6 and is adapted to engage within a slot 26 (turn again to Figure 5) in an operating handle 27 pivoted to a bracket on the valve casing 6. The handle 27 is adapted to be raised to open the valve and is held in open position by a pawl 28 which is pivoted on a bracket attached to the casing 6 above said handle, said pawl engaging a rack 29 integral with said handle. Adjacent the pawl 28 and integral therewith is a downwardly extending arm 30 which may be moved outwardly by the action of a dog 31 of a cam 32 rigidly secured on a shaft 33. It will be seen that this outward movement will cause the pawl 28 to release its engagement with rack 29 on handle 27. By turning to Figure 8 a lever 34 will be seen rigidly secured to the shaft 33. The lever 34 is connected by a vertical rod 35 at one end to a float in the float chamber 36 (Figure 1) and is provided with the weight 37 at the other end to counteract the weight of the cam 32, the parts 30 and 28 and the float rod and float ball so that the tripping mechanism will respond more quickly to the comparatively small force exerted by the float. The water in the float is renewed by the circulation obtained by connection 38 to the supply line and discharging connection 39 to the washing machine. By means of adjustable slide member 40 the float mechanism may be adjusted to release or close the valves for different heights of water.

The operation is as follows:

The valves are opened by raising the handles 27 to the position shown in Figure 6, the pawl 28 engaging the rack 29 of the handle and holding the same in open position. When the water has risen an amount which has been predetermined in the washing machine the float in the float chamber 36 (Figure 1) will raise the rod 35 which will actuate the lever 34 and cause the cam 32 to turn upon the shaft 33 and thrust the arm 30 and pawl 28 outwardly into the full line positions in Figure 8 thus releasing the rack 29 on the handle 27 so that the latter will drop from the open position of Figure 6 to the closed position of Figure 5.

As the handle 27 is raised to open position the arm 25 engaging the slot 26 of said handle is also raised and as shown in Figure 3 said arm 25 will also act to raise the arm 19 which by reference to Figure 5 will lift the stem 13. As the stem 13 is lifted the closure member 15 forming an auxiliary valve will raise off its seat providing a communication between either side of the piston member 9 through the aperture therein. As a result of said communication the pressure above the piston is not augmented when upon the further raising of the stem 13 the collar 18 thereon abuts the piston member and raises said piston and main valve. When the piston and main valve are raised the line 7 is permitted to discharge fluid through the valve to the washing machine.

By reference to Figure 7 it will be seen that as the piston member is raised upon the opening stroke, the fluid will flow from the top of the piston down through the aperture 14 in said piston. Upon the downward or closing stroke when the handles 27 have been released by the float mechanism the fluid flow will flow upward in the passage 20 since obviously the closure member 15 will close the aperture 14 in the piston member prior to the latter's downward movement. Thus a vacuum is prevented from obtaining above the piston member and a perfect balance is effected thereon by the aperture 14 and the passage 20 at all times.

It will be seen that applicant has eliminated the use of springs for automatically closing the valves by making the valves vertical whereby they close by the force of gravity on being released. It will also be evident that by the use of the improved piston and valve members a device is obtained which is more rugged and which is cheaper to make than those used heretofore.

I am aware that many changes may be made and numerous details of construction may be varied through a wide range without departing from the principles of this invention and I therefore do not purpose limiting the patent granted hereon, otherwise than necessitated by the prior art.

I claim as my invention:

1. In a device of the class described the combination with a washing machine and a float chamber connected thereto of a float in said chamber, valves for controlling the fluid supplied to said washing machine, a stem in each of said valves, a shaft extending through the side of the valve casing, an arm rigidly engaged on said shaft inside of said casing, said arm being adapted to actuate said stem, an arm rigidly engaged on said shaft outside of said casing, a lever operable in a plane normal to said outside arm having a handle and slot therein, said slot being adapted to engage said outside arm to actuate the same and cause the valve to be opened.

2. In a device of the class described the combination with a washing machine and a float chamber connected thereto of a float in said chamber, valves for controlling the fluid supplied to said washing machine, a stem in each of said valves, a shaft extending through the side of the valve casing, an arm rigidly engaged on said shaft inside of said casing, said arm being adapted to actuate said stem, an arm rigidly engaged on said shaft outside of said casing, a lever having a handle and a slot therein, said slot being adapted to engage said outside arm to actuate the same and cause the valve to be opened.

3. In a device of the class described the combination with a washing machine and a float chamber connected thereto of a float in said chamber, valves for controlling the fluid supplied to said washing machine, a stem in each of said valves, a shaft extending through the side of the valve casing, an arm rigidly engaged on said shaft inside of said casing, said arm being adapted to actuate said stem, an arm rigidly engaged on said shaft outside of said casing, a lever having a handle and a slot therein, said slot being adapted to engage said outside arm to actuate the same and cause the valve to be opened, means for holding said handle in opened position and means for releasing said holding means.

4. In a device of the class described the combination with a washing machine and a float chamber connected thereto of a float in said chamber, vertical valves for controlling the fluid supplied to said washing machine, a stem in each of said valves, a shaft extending through the side of the valve casing, an arm rigidly engaged on said shaft inside of said casing, said arm being adapted to actuate said stem, an arm rigidly engaged on said shaft outside of said casing, a lever having a handle and a slot therein, said slot being adapted to engage said outside arm to actuate the same and cause the valve to be opened.

5. In a device of the class described the combination with a washing machine and a float chamber connected thereto of a float in said chamber, vertical valves for controlling the fluid supplied to said washing machine, a stem in each of said valves, a shaft extending through the side of the valve casing, an arm rigidly engaged on said shaft inside of said casing, said arm being adapted to actuate said stem, an arm rigidly engaged on said shaft outside of said casing, a lever having a handle and a slot therein, said slot being adapted to engage said outside arm to actuate the same and cause the valve to be opened, means for holding said handle in opened position, means for releasing said holding means, and gravity means for closing said valves upon the release of said holding means.

6. In a device of the class described, the combination with a washing machine and a float chamber connected thereto, of a float in said chamber, a valve for controlling a fluid supply to said washing machine, a stem in said valve, a shaft extending through the side of the valve casing, an arm rigidly engaged inside of said casing, said arm being adapted to actuate said stem, an arm rigidly engaged on said shaft outside of said casing, a lever operable in a plane normal to said outside arm, having a handle and a slot therein, said slot being adapted to engage said outside arm to actuate the same and cause the valve to be opened.

7. In a device of the class described, the combination with a washing machine and a float chamber connected thereto, of a float in said chamber, a valve for controlling the fluid supply to said washing machine, a stem on said valve, a shaft extending through the side of the valve casing, an arm rigidly engaged inside of said casing, said arm being adapted to actuate said stem, an arm rigidly engaged on said shaft outside of said casing, a lever having a handle and a slot therein, said slot being adapted to engage said outside arm to actuate the same and cause the valve to be opened.

8. In a device of the class described, a casing, a vertical main valve mounted therein, an auxiliary valve axially aligned with said main valve, a piston valve aligned with said main valve and operable therewith, a passage in said casing controlled by said piston valve, means for regulating the area of opening of said passage, mechanism for setting said main valve in adjusted open position and means for automatically releasing said mechanism for permitting the closure of said main valve, said means including a connection between said mechanism and said auxiliary valve, said connection being effective during the closing of said main valve for permitting said mechanism to actuate said main valve to closed position.

9. In a device of the class described, a vertical valve casing, a valve therein, an outlet therefor, an auxiliary valve mounted within said valve to open prior to the opening of said valve and to close prior to the closing thereof, a piston and dash pot connected with said first mentioned valve, a release passage for said dash pot communicating around said first mentioned valve and permitting easy closing of said first mentioned valve when said auxiliary valve is first closed prior to the closure of said mentioned valve, mechanism connected to said auxiliary valve for opening the same and said main valve, means for releasing said opening mechanism for causing said mechanism to actuate said valve to closed position.

10. In a device of the class described, a casing, a vertical valve in said casing, an auxiliary valve in said valve adapted to be opened prior to the opening of said valve and to be closed prior to the closing of said valve, means for opening said auxiliary and said main valves, locking means therefor adapted to hold said opening means in adjusted open position, means for releasing said locking means for causing said opening means to actuate said valves to closed position.

11. In a device of the class described, a casing, a vertical valve in said casing, a main valve in said casing, an auxiliary valve axially aligned in said main valve and adapted to open prior to the opening of said main valve, and adapted to close prior to the closing of said main valve, means associated with the said auxiliary valve upon the opening thereof a predetermined amount to cause said main valve to be opened, and means associated with said auxiliary valve upon the closing thereof and the further actuation thereof to cause said main valve to be closed, means for opening said auxiliary valve and said main valve, means for holding said opening means in open position, means for releasing said opening means upon a predetermined flow through said main valve for permitting said opening means to actuate said auxiliary valve, and said main valve to closed position, said opening means including a connection therebetween and said auxiliary valve.

In testimony whereof I have hereunto subscribed my name.

JOSEPH HUEBSCH.